(12) United States Patent
Nakayama et al.

(10) Patent No.: US 9,793,028 B2
(45) Date of Patent: Oct. 17, 2017

(54) WIRING MODULE, WIRING-MODULE INTERMEDIARY BODY AND METHOD FOR MANUFACTURING WIRING MODULE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Osamu Nakayama, Mie (JP); Mitsutoshi Morita, Mie (JP); Tetsuya Fujita, Mie (JP)

(73) Assignees: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka ( * ) Notice: Subject to any disclaimer, the term of this patent is extended or adjusted under 35 U.S.C. 154(b) by 0 days.

(21) Appl. No.: 15/301,410

(22) PCT Filed: Apr. 6, 2015

(86) PCT No.: PCT/JP2015/060725
§ 371 (c)(1),
(2) Date: Oct. 3, 2016

(87) PCT Pub. No.: WO2015/163126
PCT Pub. Date: Oct. 29, 2015

(65) Prior Publication Data
US 2017/0117068 A1    Apr. 27, 2017

(30) Foreign Application Priority Data

Apr. 25, 2014 (JP) .................. 2014-091036

(51) Int. Cl.
*H01B 7/00* (2006.01)
*H01B 13/012* (2006.01)

(52) U.S. Cl.
CPC ..... *H01B 7/0045* (2013.01); *H01B 13/01209* (2013.01)

(58) Field of Classification Search
CPC .................. H01B 7/0045; H01B 13/01209
(Continued)

(56) References Cited

U.S. PATENT DOCUMENTS 5,643,693 A * 7/1997 Hill ...................... H01M 2/1083
429/121
5,962,814 A * 10/1999 Skipworth .......... B60R 16/0215
174/135

(Continued)

FOREIGN PATENT DOCUMENTS

JP    2011-228218    11/2011
JP    201317332    1/2013
(Continued)

OTHER PUBLICATIONS

International Search Report of May 19, 2015.
European Search Report Dated Mar. 31, 2017.

*Primary Examiner* — Timothy Thompson
*Assistant Examiner* — Charles Pizzuto
(74) *Attorney, Agent, or Firm* — Gerald E. Hespos; Michael J. Porco; Matthew T. Hespos

(57) ABSTRACT

An insulating protector (15) includes a wire routing section (70), and the wire routing section (70) includes a placement wall (71) having a placement surface (76) on which voltage detection wires (23) are to be placed. The placement wall (71) is formed with a projecting section (77) projecting from the placement surface (76), and a wire mounting section (81) on which the voltage detection wires (23) are to be mounted via a flexible hinge (80) is formed on the tip of the projecting section (77). The voltage detection wires (23) are mounted on the wire mounting section (81) with the wire mounting
(Continued)

section (81) oriented to extending in a direction along the placement surface (76). The wire mounting (81) is oriented to extend in a direction intersecting the placement surface (76) by bending the hinge (80) after the voltage detection wires (23) are mounted on the wire mounting section (81).

6 Claims, 8 Drawing Sheets

(58) Field of Classification Search
USPC ...................................................... 174/72 A
See application file for complete search history.

(56) References Cited

U.S. PATENT DOCUMENTS

| | | | |
|---|---|---|---|
| 6,376,768 B1* | 4/2002 | Saito ................... | B60R 16/0215 174/507 |
| 2012/0183833 A1 | 7/2012 | Ikeda et al. | |
| 2013/0010449 A1 | 1/2013 | Ikeda et al. | |
| 2014/0045388 A1 | 2/2014 | Nakayama | |
| 2014/0065885 A1* | 3/2014 | Nakayama ............ | H01M 2/206 439/627 |
| 2014/0370342 A1* | 12/2014 | Nakayama .......... | H01M 10/482 429/90 |
| 2015/0070025 A1 | 3/2015 | Nakayama et al. | |
| 2016/0197461 A1* | 7/2016 | Kitamura ............... | H01R 24/20 174/72 A |

FOREIGN PATENT DOCUMENTS

| | | |
|---|---|---|
| JP | 2014-7105 | 1/2014 |
| JP | 2014-22169 | 2/2014 |

* cited by examiner

WIRING MODULE, WIRING-MODULE INTERMEDIARY BODY AND METHOD FOR MANUFACTURING WIRING MODULE

BACKGROUND

1. Field of the Invention

The present invention relates to a wiring module, a wiring-module intermediary body and a method for manufacturing a wiring module.

2. Description of the Related Art

Japanese Unexamined Patent Publication No. 2011-228218 discloses a battery connection plate overlapped with and mounted on a battery assembly composed of a plurality of batteries and having busbars connected to terminals of the batteries. This battery connection plate includes a wiring material mounting section in which a plurality of signal output wires connected to the respective busbars can be arranged.

However, according to the above technique, the wiring-module mounting section is formed only in a direction along a plate surface of the battery connection plate. Thus, there has been a problem of being considerably difficult to route the signal output wires in a direction intersecting with the wiring-module mounting section.

The present invention was completed based on the above situation.

SUMMARY

The present invention is directed to a wiring module to be mounted on a power storage element group with a plurality of power storage elements. The wiring module includes an insulating protector made of insulating synthetic resin and a plurality of wires routed in the insulating protector. The insulating protector includes a wire routing section in which the plurality of wires are routed. The wire routing section includes a placement wall having a placement surface on which the wires are placed. The placement wall is formed with a projecting section projecting from the placement surface, and a wire mounting section having the plurality of wires mounted thereon via a flexible hinge section is formed on the tip of the projecting section. The wires are mounted on the wire mounting section with the wire mounting section oriented to extend in a direction along the placement surface, and the wire mounting section is oriented to extend in a direction intersecting with the placement surface by bending the hinge section after the wires are mounted on the wire mounting section.

The present invention also is directed to a method for manufacturing a wiring module to be mounted on a power storage element group with a plurality of power storage elements. The method includes a step of forming an insulating protector with a wire routing section including a placement wall having a placement surface on which wires are to be placed, a projecting section projecting from the placement surface of the placement wall and a wire mounting section formed on the tip of the projecting section and having the wires mounted thereon via a flexible hinge section. The method proceeds with a step of placing the plurality of wires on the placement wall of the wire routing section. The method continues with a step of mounting the plurality of wires on the wire mounting section with the wire mounting section oriented to extend in a direction along the placement surface, and a step of orienting the wire mounting section to extend in a direction intersecting with the placement surface by bending the hinge section after the wires are mounted on the wire mounting section.

The wires are placed on the placement surface of the placement wall by being routed in the wire routing section. In this way, the wires are routed in the wire routing section while being oriented to extend in the direction along the placement surface. Since the wire mounting section is oriented to extend in the direction along the placement surface when the wires are mounted on the wire mounting section, an operation of mounting the plurality of wires can be performed easily. Thereafter, a simple operation of bending the hinge section has only to be performed for the plurality of wires to be oriented to extend in the direction intersecting with the placement surface. In this way, the orientation of the wire mounting section can be changed to extend in the direction intersecting the placement surface. As a result, the plurality of wires can be easily routed in the direction intersecting with the placement surface of the placement wall.

Further, in the present invention, the hinge section is formed on the tip of the projecting section projecting from the placement wall. In this way, a height difference corresponding to a projection height of the projecting section from the placement wall is formed between the plurality of wires placed on the placement wall and the plurality of wires mounted on the wire mounting section. By this height difference, a space is formed among the placement wall, the projecting section and the plurality of wires. The wires are accommodated into this space when the wires are bent to intersect with the placement surface. In this way, excessive deflection of the plurality of wires can be suppressed when the wires are bent to intersect with the placement surface.

The wire mounting section may be formed with a stopper formed on an end part opposite to the hinge section to project toward a side opposite to the one where the wires are to be mounted and is configured to retain a fastening member for mounting the wires on the wire mounting section. Accordingly, the detachment of the wires from the wire mounting section can be suppressed.

The wire mounting section may be formed with an auxiliary wall formed to stand up on a surface where the wires are to be mounted. Accordingly, the detachment of the wires from the wire mounting section can be suppressed.

The wires may be connected to the power storage elements and may detect voltages of the plurality of power storage elements.

As the number of the power storage elements increases, the number of the wires also increases. Then, the rigidity of a bundle of the plurality of wires increases, and an operation of changing a routing direction of the plurality of wires may become difficult. However, according to this aspect, the routing direction of the plurality of wires can be changed by a simple operation of bending the hinge section.

The present invention also is directed to a wiring-module intermediary body with an insulating protector made of insulating synthetic resin and a plurality of wires routed in the insulating protector. The insulating protector may include a wire routing section in which the wires are routed. The wire routing section may include a placement wall having a placement surface on which the wires are placed. The placement wall is formed with a projecting section projecting from the placement surface. A wire mounting section having the wires mounted thereon via a flexible hinge section is formed on the tip of the projecting section, and the wires are mounted on the wire mounting section with the wire mounting section oriented to extend in a direction along the placement surface.

According to the present invention, the wires are mounted on the wire mounting section while being oriented to extend in the direction along the placement surface. Thus, it can be suppressed that the wires project in a direction intersecting with the placement surface of the placement wall to contact external matter when the wiring-module intermediary body is transported.

According to the present invention, it is possible to easily route a plurality of wires in a direction intersecting with a placement surface of a placement wall.

DETAILED DESCRIPTION

Figure 1:
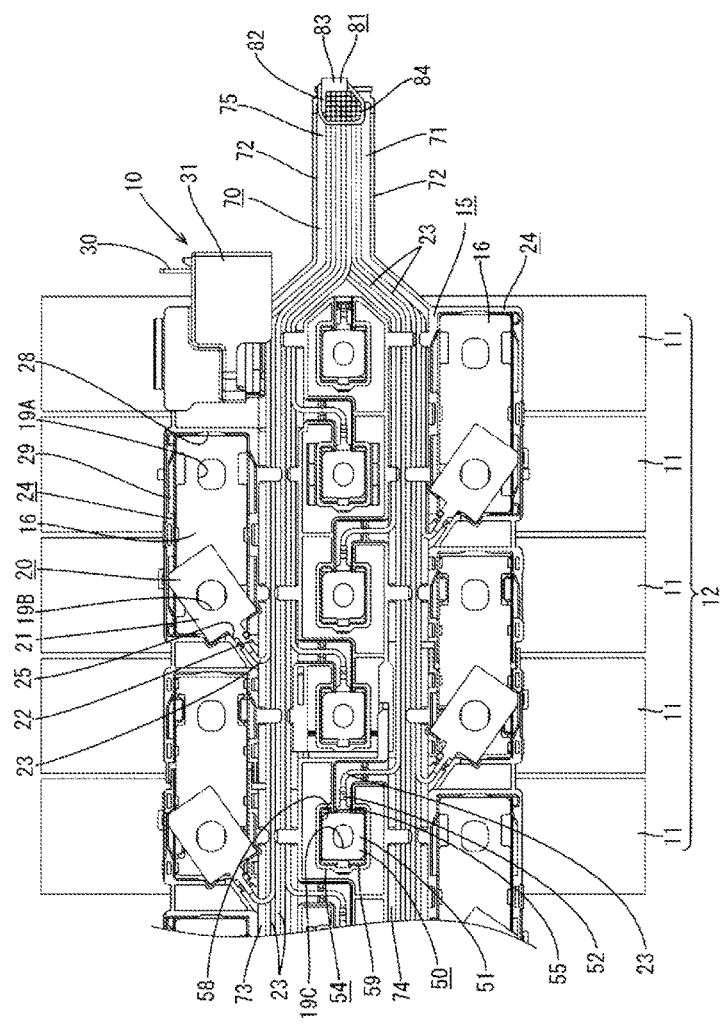
FIG. 1 is a plan view showing a wiring module according to one embodiment of the present invention.

One embodiment of the present invention is described with reference to FIGS. 1 to 8. As shown in FIG. 1, a wiring module 10 according to this embodiment configures a power storage module 13 by being mounted on a power storage element group 12 formed by arranging a plurality of power storage elements 11. The power storage module 13 is used as a power source for driving a vehicle (not shown) such as an electric vehicle or a hybrid vehicle by being installed in the vehicle.

Figure 4:
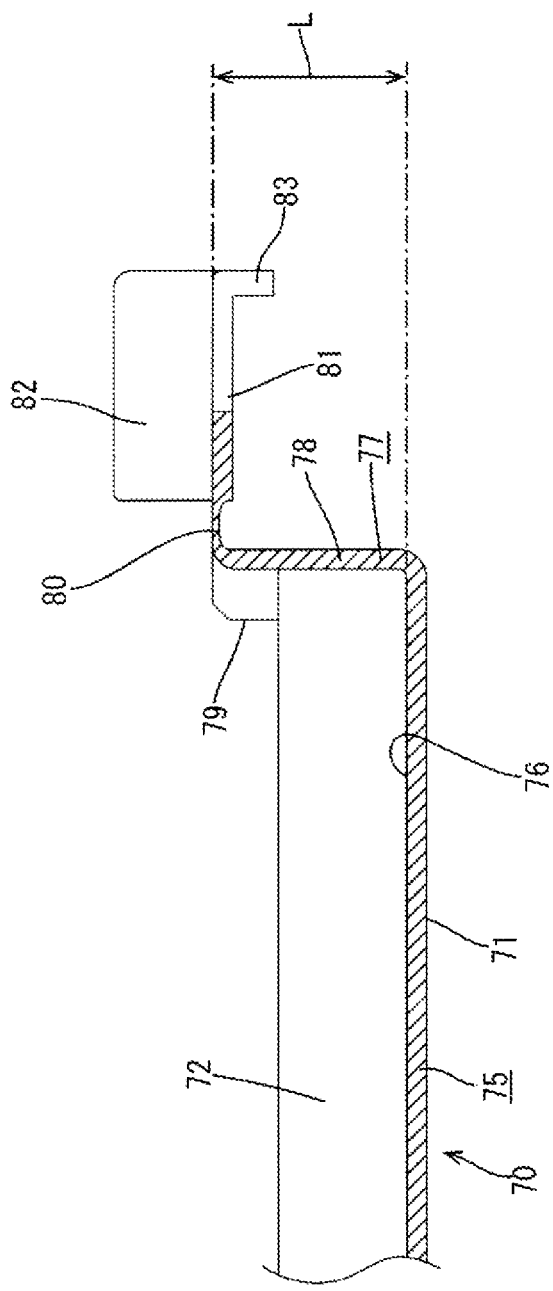
FIG. 4 is a partial enlarged section showing a wire mounting section.

In the following description, left and right sides in FIG. 1 are referred to as left and right sides. Further, lower and upper sides in FIG. 1 are referred to as front and rear sides. Further, upper and lower sides in FIG. 4 are referred to as upper and lower sides. Further, in the following description, one member is denoted by a reference sign and other members are not denoted by the reference sign in some cases for a plurality of same members.

(Power Storage Element 11)

The power storage element 11 according to this embodiment is a secondary battery. An unillustrated power storage part is accommodated in the power storage element 11. The power storage element 11 has a substantially rectangular parallelepiped shape. On the upper surface of the power storage element 11, a pair of electrode terminals are formed at positions near opposite end parts in a front-back direction. One of the electrode terminals is a positive electrode terminal and the other is a negative electrode terminal. The power storage elements 11 are arranged such that adjacent electrode terminals have different polarities. A plurality of power storage elements 11 are arranged in a lateral direction to configure the power storage element group 12.

(Wiring Module 10)

The wiring module 10 is mounted on the upper surface of the power storage element group 12. The wiring module 10 is shaped to be long and narrow in the lateral direction.

Figure 2:
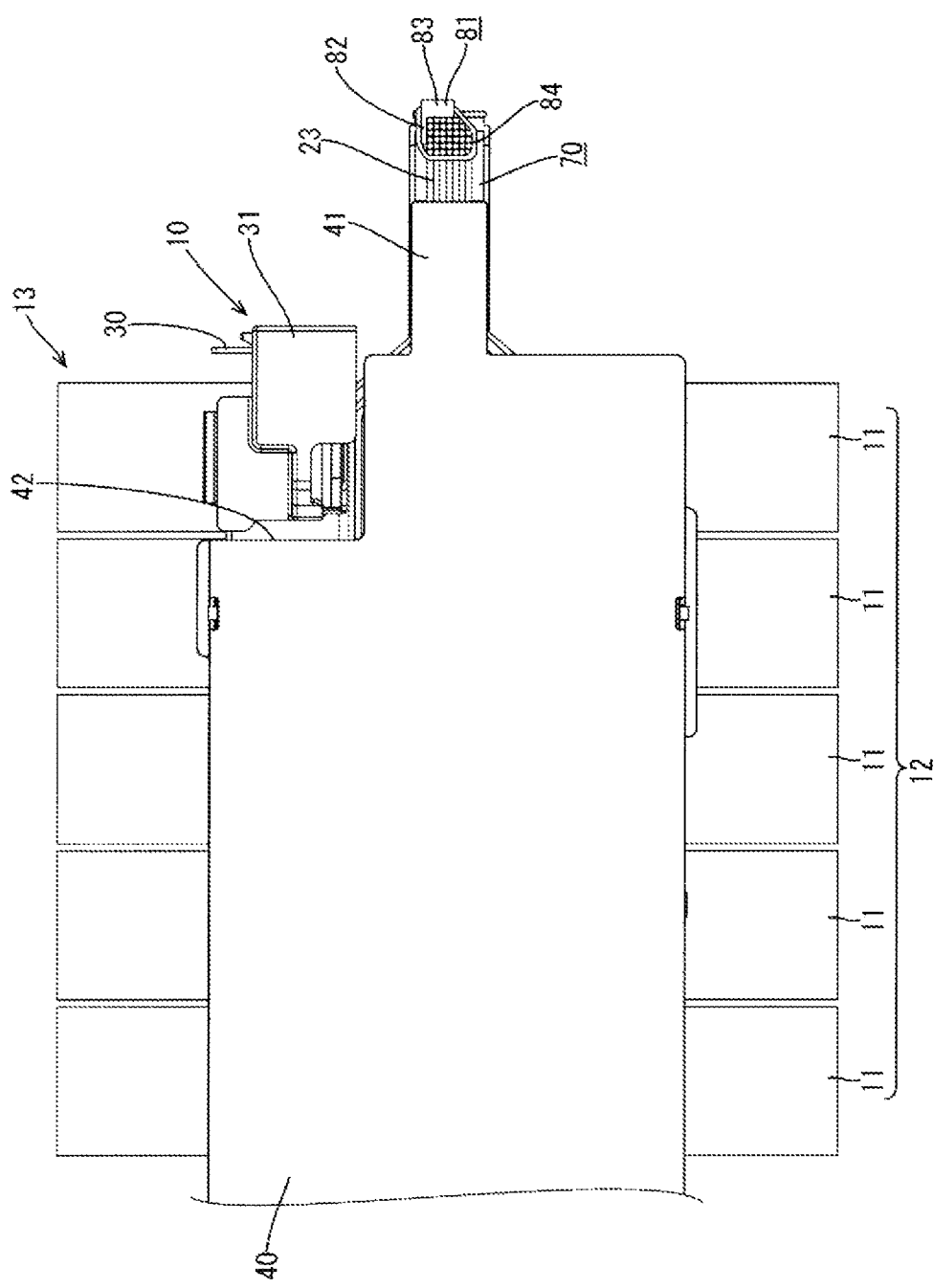
FIG. 2 is a plan view showing a power storage module.

As shown in FIG. 1, the wiring module 10 includes an insulating protector 15, a plurality of busbars 16 accommodated in the insulating protector 15 and a cover 40 for covering the insulating protector 15 from above by being mounted on the insulating protector 15 (see FIG. 2).

(Insulating Protector 15)

The insulating protector 15 is formed of insulating synthetic resin. The insulating protector 15 is formed with a plurality of first accommodating sections 24 for accommodating each of the plurality of busbars 16.

As shown in FIG. 1, the first accommodating section 24 has a substantially rectangular shape long and narrow in the lateral direction when viewed from above and slightly larger than the busbar 16. The first accommodating section 24 is formed with a first peripheral wall 29 surrounding around the busbar 16. An opening 28 open upward is formed on the upper end of the first peripheral wall 29, and the busbar 16 and a first voltage detection terminal 20 are accommodated into this opening 28.

A first slit 25 extending in a vertical direction is formed on one of four corners of the first accommodating section 24. An upper end of the first slit 25 is open upward.

The plurality of first accommodating sections 24 are arranged at intervals in the lateral direction and also in the front-back direction.

(Busbar 16)

The busbar 16 is formed by press-working a metal plate material into a predetermined shape. An arbitrary metal such as copper, copper alloy, iron, iron alloy, aluminum or aluminum alloy can be appropriately selected as the metal plate material according to need. The busbar 16 is shaped to be long and narrow in the lateral direction when viewed from above. A through hole 19A through which an unillustrated bolt is to be inserted is formed to penetrate through the busbar 16. The electrode terminal and the busbar 16 are electrically connected by threadably engaging the bolt with the electrode terminal formed with a screw hole with the bolt inserted through the through hole 19A.

(First Voltage Detection Terminal 20)

The voltage detection terminal 20 for detecting a voltage of the power storage element 11 is overlapped on the busbar 16. The first voltage detection terminal 20 is formed by press-working a metal plate material into a predetermined shape. An arbitrary metal such as copper, copper alloy, iron, iron alloy, aluminum or aluminum alloy can be appropriately selected as the metal plate material according to need. The first voltage detection terminal 20 includes a plate-like electrode connecting section 21 and a barrel section 22 extending from the electrode connecting section 21.

The electrode connecting section 21 is formed with a through hole 19B through which a bolt is to be inserted. The first voltage detection terminal 20 is electrically connected to the electrode terminal by being sandwiched between a head part of the bolt and the busbar 16 on one of adjacent electrode terminals connected by the busbar 16.

The barrel section 22 is crimped to one end part of a voltage detection wire 23 (an example of a wire). The other end part of the voltage detection wire 23 is connected to an externally connected device (not shown) such as an ECU. The barrel section 22 extends from one side of the electrode connecting section 21.

The barrel section 22 is accommodated in the first slit 25 of the first accommodating section 24. In this way, the barrel section 22 is drawn out to the outside of the first accommodating section 24 from one of four corners of the first accommodating section 24.

Note that the ECU is equipped with a microcomputer, elements and the like and has a known configuration provided with functions of detecting voltages, currents, temperatures and the like of the power storage elements 11, controlling the charging and discharging of each power storage element 11 and the like.

(Second Voltage Detection Terminal 50)

Further, a monitor electrode (not shown) electrically connected to the power storage part and configured to monitor a voltage of the power storage part is formed at a position near a center in the front-back direction on the upper surface of the power storage element 11. A second voltage detection terminal 50 is connected on the upper surface of this monitor electrode. The second voltage detection terminal 50 is formed by press-working a metal plate material into a predetermined shape. An arbitrary metal such as copper, copper alloy, iron, iron alloy, aluminum or aluminum alloy can be appropriately selected as the metal plate material according to need. The second voltage detection terminal 50 includes a plate-like electrode connecting section 51 and a barrel section 52 extending from the electrode connecting section 51.

The electrode connecting section 51 is formed with a through hole 19C through which an unillustrated bolt is to be inserted. The second voltage detection terminal 50 is electrically connected to the monitor electrode by being sandwiched between a head part of the bolt and the monitor electrode.

The barrel section 52 is crimped to one end part of a voltage detection wire 23 (an example of a wire). The other end part of the voltage detection wire 23 is connected to the externally connected device (not shown) such as an ECU. The barrel section 52 extends from one side of the electrode connecting section 51.

The insulating protector 15 is formed with second accommodating sections 54 for accommodating the second voltage detection terminals 50 at positions between the plurality of first accommodating sections 24 arranged at a distance in the front-back direction.

As shown in FIG. 1, the second accommodating section 54 has a substantially rectangular shape when viewed from above and shaped to be slightly larger than the second voltage detection terminal 50. The second accommodating section 54 is formed with a second peripheral wall 59 surrounding around the second voltage detection terminal 50. An opening 58 open upward is formed on the upper end of the second peripheral wall 59, and the second voltage detection terminal 50 is accommodated into this opening 58.

The second peripheral wall 59 forming the second accommodating section 54 is formed with a second slit 55 extending in the vertical direction. An upper end part of the second slit 55 is open upward.

The barrel section 52 of the second voltage detection terminal 50 is accommodated in the second slit 55. In this way, the barrel section 52 of the second voltage detection terminal 50 is drawn out to the outside of the second accommodating section 54 through the second slit 55.

(Wire Routing Section 70)

Figure 3:
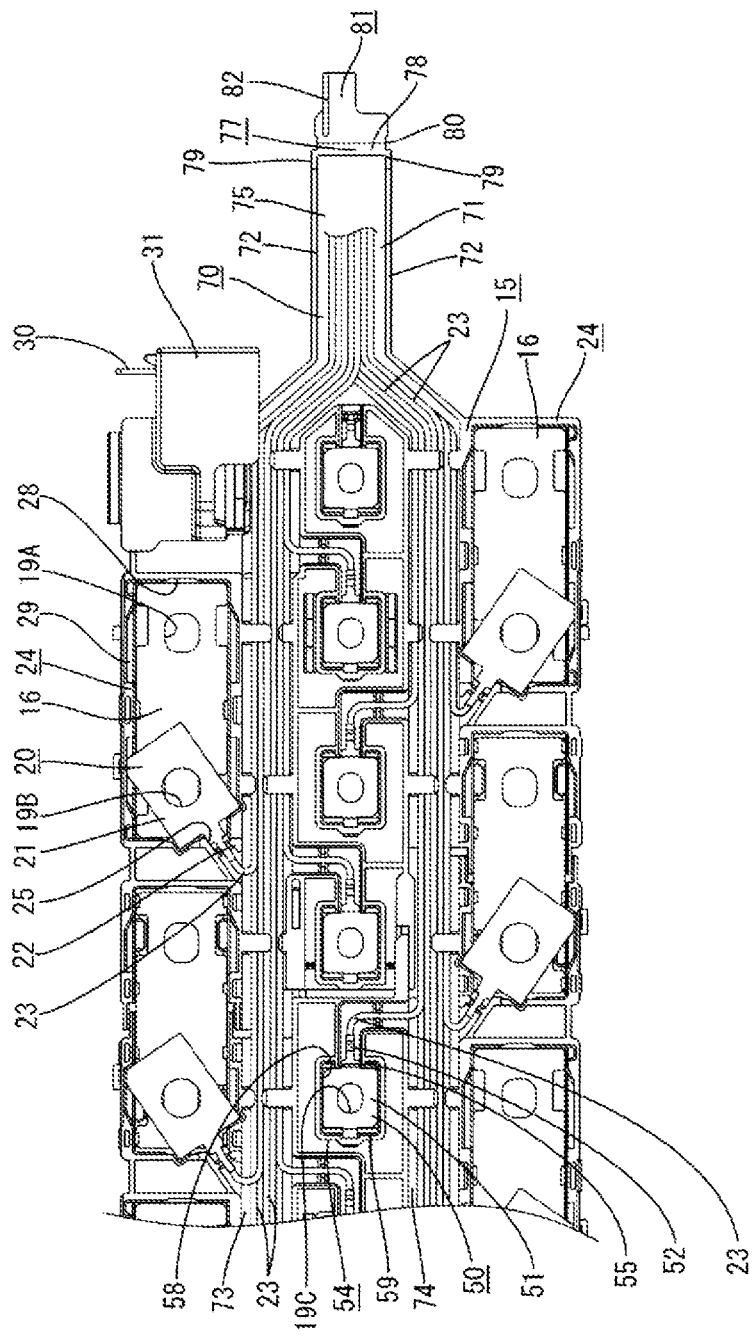
FIG. 3 is a plan view showing a state where voltage detection wires are routed in an insulating protector.

As shown in FIG. 3, the insulating protector 15 is formed with a wire routing section 70 in which the plurality of voltage detection wires 23 are to be routed. The wire routing section 70 is formed to be long and narrow along an extending direction (lateral direction) of the insulating protector 15.

The wire routing section 70 is formed into a groove with a placement wall 71 on which the plurality of voltage detection wires 23 are to be placed, and a pair of side walls 72 formed to stand up from side edges of this placement wall 71. The upper surface of the placement wall 71 serves as a placement surface 76 on which the voltage detection wires 23 are to be placed. The wire routing section 70 includes a first branch section 73 formed between the plurality of first accommodating sections 24 arranged on the front side (lower side in FIG. 1) and the plurality of second accommodating sections 54, a second branch section 74 formed between the plurality of first accommodating sections 24 arranged on the rear side (upper side in FIG. 1) and the plurality of second accommodating sections 54 and a junction section 75 where a right end part of the first branch section 73 and that of the second branch section 74 approach each other and which extends rightward.

As shown in FIG. 4, a projecting section 77 projecting in a standing direction (upward) of the side walls 72 from the placement surface 76 of the placement wall 71 is formed on a right end part of the junction section 75. The projecting section 77 includes a main body 78 extending in the front-back direction and two extending sections 79 respectively extending leftward from front and rear end parts of the main body 78 when viewed from above. The extending section 79 of the projecting section 77 is continuously formed with right end parts of the side walls 72. Further, an upward projection height of the projecting section 77 from the placement wall 71 is set to be larger than that of the side walls 72 from the placement wall 71.

A hinge section 80 integrally formed to the main body 78 is formed on an upper end part of the main body 78 of the projecting section 77. The hinge section 80 is formed to be thinner than the projecting section 77 and a wire mounting section 81 and is flexible. The hinge section 80 is formed with a wire mounting section 81, on which the plurality of voltage detection wires 23 are to be mounted, on an end part opposite to the main body 78. In other words, the wire mounting section 81 is formed on the upper end part of the projecting section 77 via the hinge section 80.

The wire mounting section 81 is plate-like and formed to be slightly wider than the hinge section 80 on an end part on the side of the hinge section 80. Further, a right-front end part of the wire mounting section 81 is recessed when viewed from above in FIG. 3. By recessing a part of the wire mounting section 81 in this way, a fastening member 84 is easily wound around the wire mounting section 81 and the voltage detection wires 23.

As shown in FIG. 4, an auxiliary wall 82 extending in a lateral direction of FIG. 4 is formed to project upward on a rear end part of the wire mounting section 81. The auxiliary wall 82 has a substantially rectangular shape when viewed in the front-back direction. A lateral length of the auxiliary wall 82 is set to be equal to or slightly shorter than that of the wire mounting section 81.

Figure 5:
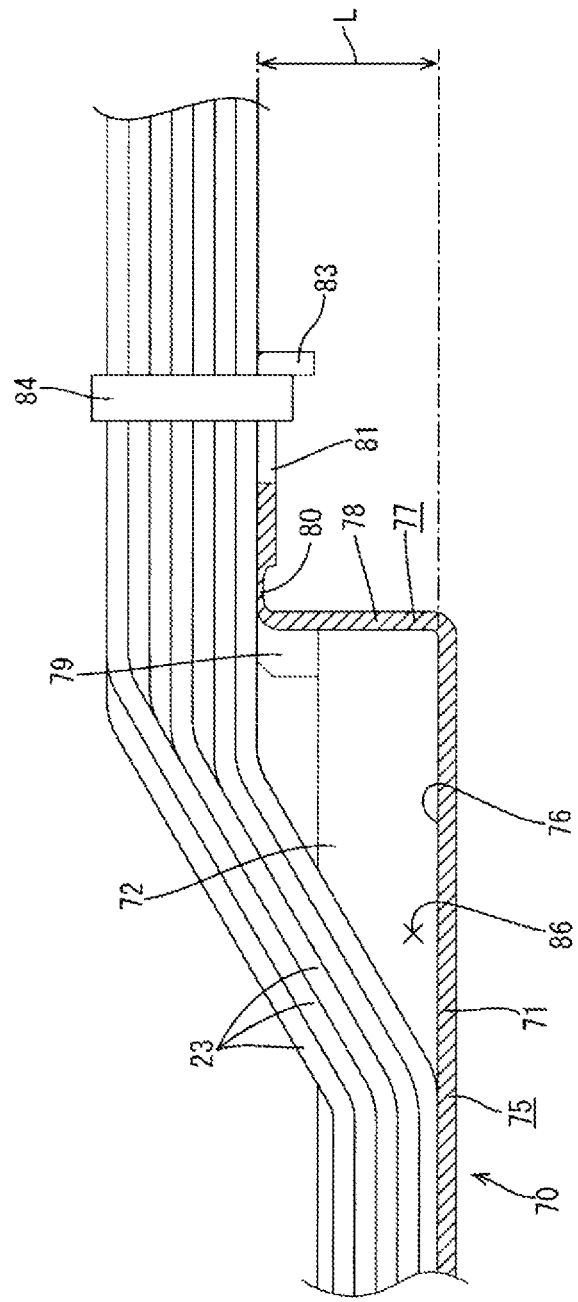
FIG. 5 is a partial enlarged section showing a state where the voltage detection wires are mounted in the wire mounting section.

As shown in FIG. 4, a stopper 83 projecting downward is formed on a right end part of the wire mounting section 81. As shown in FIG. 5, the stopper 83 comes into contact with the fastening member 84 for mounting the plurality of voltage detection wires 23 on the wire mounting section 81 from right, thereby suppressing rightward detachment of the fastening member 84 from the wire mounting section 81.

(Cover 40)

As shown in FIG. 2, the cover 40 made of synthetic resin is mounted on the upper surface of the insulating protector 15, whereby the upper surface of the insulating protector 15 is covered by the cover 40. The cover 40 is substantially formed in conformity with the shape of the insulating protector 15 viewed from above. An extension cover section 41 extending rightward is formed at a position of a right end part of the cover 40 corresponding to the junction section 75 of the wire routing section 70. A lateral length of the extension cover section 41 is set to be shorter than that of the junction section 75 and the junction section 75 and the wire mounting section 81 are exposed to the right of the extension cover section 41.

As shown in FIG. 2, a right-rear end part of the cover 40 in FIG. 2 is recessed into a concave section 42. The insulating protector 15 is partially exposed in an area corresponding to the concave section 42. An external connection terminal 30 for connecting the power storage module 13 and an external device is arranged on a part of the insulating protector 15 exposed from the concave section 42. The external connection terminal 30 is covered from above by an external connection terminal cover 31 formed on the insulating protector 15.

(Mounting Structure of Voltage Detection Wires 23 on Wire Mounting Section 81)

Figure 6:
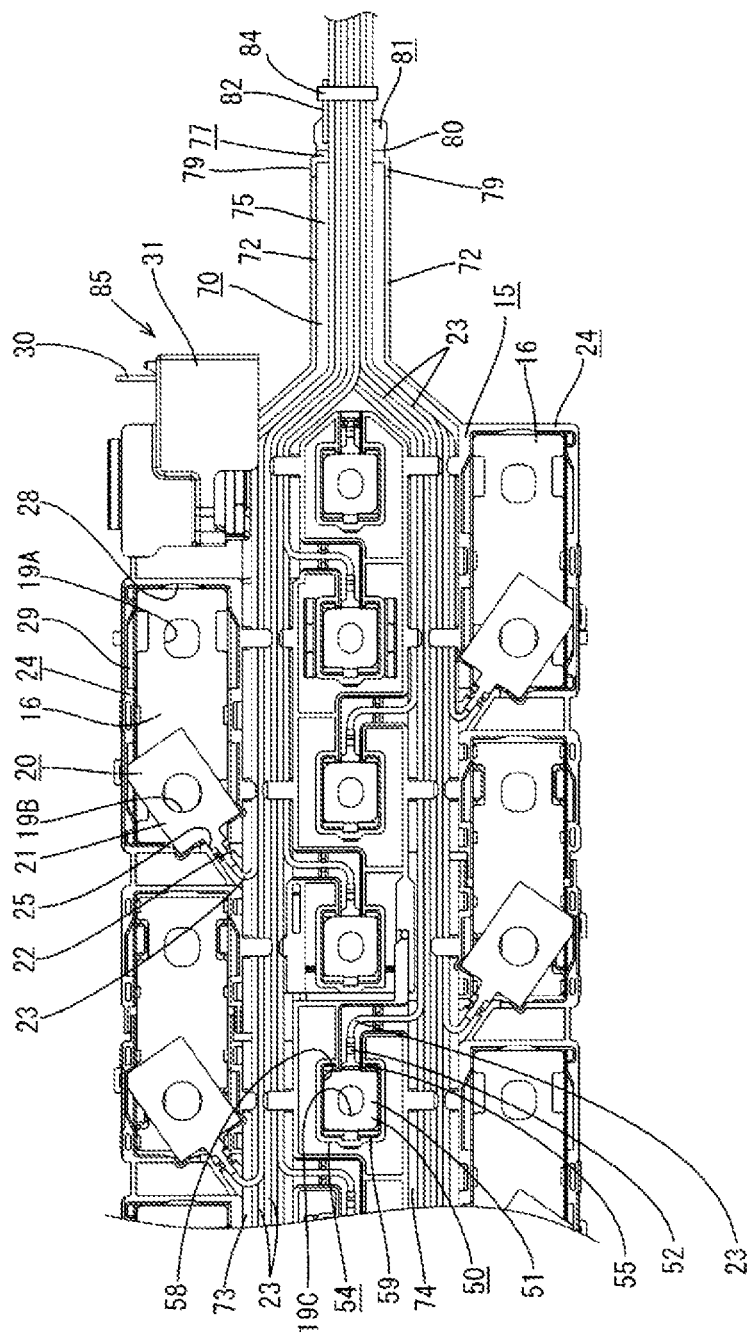
FIG. 6 is a plan view showing a wiring-module intermediary body.

As shown in FIGS. 5 and 6, the plurality of voltage detection wires 23 are mounted on the wire mounting section 81 by the fastening member 84 with the wire mounting section 81 oriented to extend in a direction along the placement surface 76. In this embodiment, the plurality of voltage detection wires 23 are mounted on the wire mounting section 81 with the wire mounting section 81 oriented to extend in a direction parallel to the placement surface 76.

The fastening member 84 is formed into a long and narrow strip. The fastening member 84 is made of an arbitrary material such as synthetic resin or metal according to need.

With the plurality of voltage detection wires 23 placed on the upper surface of the wire mounting section 81, the fastening member 84 is wound around the plurality of voltage detection wires 23 and the wire mounting section 81. The fastening member 84 is fixed by a known fastening means while fastening the plurality of voltage detection wires 23 and the wire mounting section 81.

As shown in FIG. 5, the stopper 83 comes into contact with the fastening member 84 from right, thereby suppressing rightward detachment of the stopper 83.

As shown in FIG. 5, the projecting section 77 projects from the placement surface 76 of the placement wall 71, whereby a space 86 is formed in an area surrounded by the plurality of voltage detection wires 23, the placement wall 71 and the projecting section 77.

Figure 7:
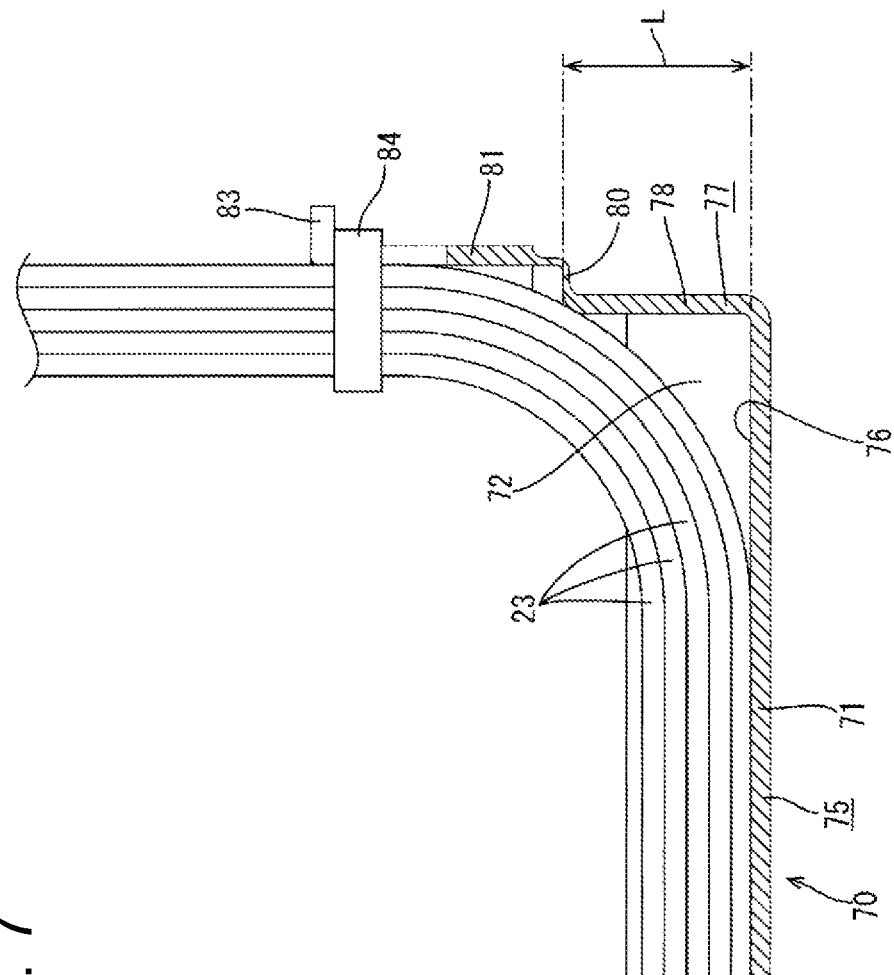
FIG. 7 is a partial enlarged section showing a state where the wire mounting section is oriented to extend in a direction intersecting with a placement surface.

As shown in FIG. 7, the wire mounting section 81 is oriented to extend in a direction intersecting with the placement surface 76 by bending the hinge section 80 with the plurality of voltage detection wires 23 mounted on the wire mounting section 81. In this embodiment, the wire mounting section 81 is oriented to extend in a direction substantially perpendicular to the placement surface 76. Note that directions of the wire mounting section 81 at 90° and also at 85° to 95° to the placement surface 76 fall under the substantially perpendicular direction.

As shown in FIG. 7, with the hinge section 80 bent, the plurality of voltage detection wires 23 are bent in a direction intersecting with the placement surface 76 of the placement wall 71. In the case of bundling the plurality of voltage detection wires 23, an area where the plurality of voltage detection wires 23 are deflected is necessary to bend the plurality of voltage detection wires 23. The more the voltage detection wires 23, the larger the area necessary to allow the deflection of the voltage detection wires 23.

In this embodiment, the deflected voltage detection wires 23 are accommodated into the space 86 formed in FIG. 5.

Figure 8:
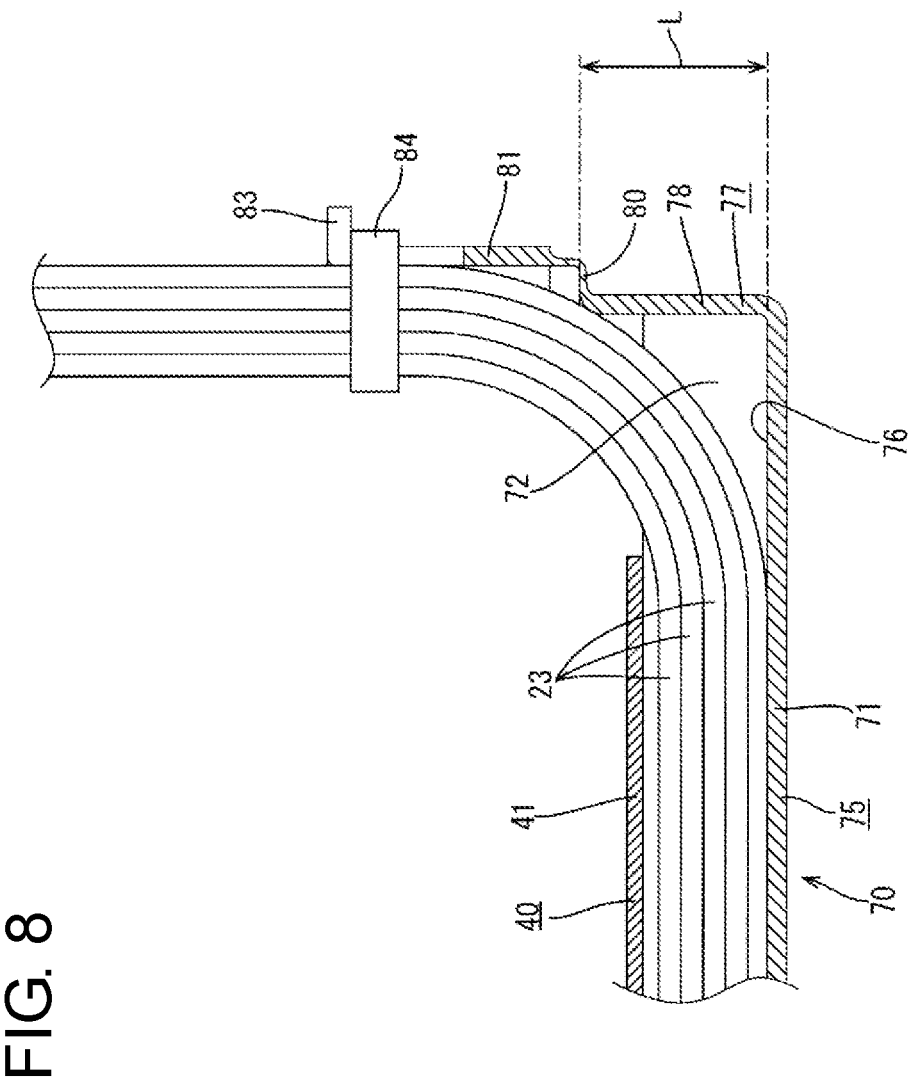
FIG. 8 is a partial enlarged section showing the wire mounting section with a cover mounted on the insulating protector.

Note that, as shown in FIG. 8, the extension cover section 41 and the plurality of voltage detection wires 23 are separated so as not to interfere with each other with the hinge section 80 bent and the cover 40 mounted on the insulating protector 15.

(Example of Manufacturing Process of Embodiment)

Next, an example of a manufacturing process of the power storage module 13 according to this embodiment is described. Note that the manufacturing process of the power storage module 13 is not limited to the one described below.

First, the insulating protector 15 is injection-molded of insulating synthetic resin into a predetermined shape. The busbars 16 are accommodated into the first accommodating sections 24 of the insulating protector 15.

Further, the first and second voltage detection terminals 20, 50 are formed into predetermined shapes by press-working the metal plate materials. The barrel sections 22 of the first voltage detection terminals 20 are crimped to end parts of the voltage detection wires 23. Further, the barrel sections 52 of the second voltage detection terminals 50 are crimped to end parts of the voltage detection wires 23.

The first voltage detection terminals 20 are accommodated into the first accommodating sections 24 of the insulating protector 15. At this time, the barrel sections 22 are accommodated into the first slits 25. The voltage detection wires 23 connected to the barrel sections 22 are routed in the wire routing section 70.

Further, the second voltage detection terminals 50 are accommodated into the second accommodating sections 54 of the insulating protector 15. At this time, the barrel sections 52 are accommodated into the second slits 55. The voltage detection wires 23 connected to the barrel sections 52 are routed in the wire routing section 70.

The plurality of voltage detection wires 23 are routed in the wire routing section 70. Specifically, the voltage detection wires 23 are routed into the junction section 75 after being routed in the first or second branch section 73, 74. The plurality of voltage detection wires 23 are bundled into one in the junction section 75.

The plurality of voltage detection wires 23 are placed on the upper surface of the wire mounting section 81 with the wire mounting section 81 oriented to extend in a direction along the placement surface 76 of the placement wall 71. Thereafter, the fastening member 84 is wound around the plurality of voltage detection wires 23 and tightened, thereby mounting the plurality of voltage detection wires 23 on the wire mounting section 81. In this way, a wiring-module intermediary body 85 is formed.

A plurality of wiring-module intermediary bodies 85 are transported to an unillustrated other factory. At this time, the plurality of wiring-module intermediary bodies 85 may be laminated in a direction intersecting with the placement surfaces 76 of the placement walls 71.

The wiring-module intermediary body 85 transported to the other factory is mounted on the power storage element group 12 in which the plurality of power storage elements 11 are arranged. The electrode terminals of the power storage elements 11 and the busbars 16 are electrically connected.

The wire mounting section 81 is oriented to extend in a direction intersecting with the placement surface 76 of the placement wall 71 by bending the hinge section 80 of the insulating protector 15. The upper surface of the insulating protector 15 is covered by mounting the cover 40 on the upper surface of the insulating protector 15. In this way, the power storage module 13 is completed.

(Functions and Effects of Embodiment)

Next, functions and effects of this embodiment are described. According to this embodiment, the wiring module 10 to be mounted on the power storage element group 12 with the plurality of power storage elements 11 is configured as follows. Specifically, the wiring module 10 includes the insulating protector 15 made of insulating synthetic resin and the plurality of voltage detection wires 23 routed in the insulating protector 15. The insulating protector 15 includes the wire routing section 70 in which the plurality of voltage detection wires 23 are routed. The wire routing section 70 includes the placement wall 71 having the placement surface 76 on which the plurality of voltage detection wires 23 are to be placed, the placement wall 71 is formed with the projecting section 77 projecting from the placement surface 76, and the wire mounting section 81 is formed on the tip of the projecting section 77 via the flexible hinge section 80. The plurality of voltage detection wires 23 are mounted on the wire mounting section 81. The plurality of voltage detection wires 23 are mounted on the wire mounting section 81 with the wire mounting section 81 oriented to extend in a direction along the placement surface 76. By bending the hinge section 80 after the plurality of voltage detection wires 23 are mounted on the wire mounting section 81, the wire mounting section 81 is oriented to extend in a direction intersecting with the placement surface 76.

The plurality of voltage detection wires 23 are placed on the placement surface 76 of the placement wall 71 by being routed in the wire routing section 70. In this way, the plurality of voltage detection wires 23 are routed in the wire routing section 70 while being oriented to extend in the direction along the placement surface 76. Since the wire mounting section 81 is oriented to extend in the direction along the placement surface 76 when the plurality of voltage detection wires 23 are mounted on the wire mounting section 81, the plurality of voltage detection wires 23 can be easily mounted. Thereafter, a simple operation of bending the hinge section 80 has only to be performed to orient the plurality of voltage detection wires 23 in the direction intersecting with the placement surface 76. By this operation, the orientation of the wire mounting section 81 can be changed to the one extending in the direction intersecting with the placement surface 76. As a result, the plurality of voltage detection wires 23 can be easily arranged in the direction intersecting with the placement surface 76 of the placement wall 71.

Further, in this embodiment, the hinge section 80 is formed on the tip of the projecting section 77 projecting from the placement wall 71. In this way, a height difference corresponding to a projection height L of the projecting section 77 from the placement wall 71 is formed between the plurality of voltage detection wires 23 placed on the placement wall 71 and the plurality of voltage detection wires 23 mounted on the wire mounting section 81. By this height difference, the space 86 is formed among the placement wall 71, the projecting section 77 and the plurality of voltage detection wires 23. The plurality of voltage detection wires 23 are accommodated into this space 86 when the plurality of voltage detection wires 23 are bent and oriented to intersect with the placement surface 76. In this way, excessive deflection of the plurality of voltage detection wires 23 can be suppressed when the plurality of voltage detection wires 23 are bent and oriented to intersect with the placement surface 76.

Further, according to this embodiment, the wire mounting section 81 is formed with the stopper 83 on the end part opposite to the hinge section 80 to project toward the side opposite to the one where the plurality of voltage detection wires 23 are mounted and configured to retain the fastening member 84 for mounting the plurality of voltage detection wires 23 on the wire mounting section 81. In this way, rightward detachment of the fastening member 84 from the wire mounting section 81 can be suppressed, whereby the detachment of the plurality of voltage detection wires 23 from the wire mounting section 81 can be suppressed.

Further, according to this embodiment, the wire mounting section 81 is formed with the auxiliary wall 82 standing up on the surface where the plurality of voltage detection wires 23 are to be mounted. In this way, the detachment of the plurality of voltage detection wires 23 from the wire mounting section 81 can be suppressed.

Further, according to this embodiment, the plurality of voltage detection wires 23 are connected to the plurality of power storage elements 11 and detect voltages of the plurality of power storage elements 11. As the number of the power storage elements 11 increases, the number of the voltage detection wires 23 also increases. Then, the rigidity of the bundle of the plurality of voltage detection wires 23 increases, wherefore an operation of changing a routing direction of the plurality of voltage detection wires 23 may become difficult. According to this embodiment, the routing direction of the plurality of voltage detection wires 23 can be changed by a simple operation of bending the hinge section 80.

Further, according to this embodiment, the wiring-module intermediary body 85 with the insulating protector 15 made of insulating synthetic resin and the plurality of voltage detection wires 23 routed in the insulating protector 15 is configured as follows. Specifically, the insulating protector 15 includes the wire arrangement section 70 having the plurality of voltage detection wires 23 routed therein, the wire arrangement section 70 includes the placement wall 71 having the placement surface 76 on which the plurality of voltage detection wires 23 are placed, the placement wall 71 is formed with the projecting section 77 projecting from the placement surface 76, the wire mounting section 81 on which the plurality of voltage detection wires 23 are to be mounted is formed on the tip of the projecting section 77 via the flexible hinge section 80, and the plurality of voltage detection wires 23 are mounted on the wire mounting section 81 with the wire mounting section 81 oriented to extend in a direction along the placement surface 76.

According to this embodiment, since the plurality of voltage detection wires 23 are mounted on the wire mounting section 81 while being oriented to extend in the direction along the placement surface 76, it can be suppressed that the plurality of voltage detection wires 23 project in a direction intersecting with the placement surface 76 of the placement wall 71 to contact external matters when the wiring-module intermediary body 85 is transported.

Further, in this embodiment, a method for manufacturing the wiring module 10 to be mounted on the power storage element group 12 with the plurality of power storage elements 11 includes a step of forming the insulating protector 15 with the wire arrangement section 70 including the placement wall 71 having the placement surface 76 on which the plurality of voltage detection wires 23 are to be placed, the projecting section 77 projecting from the placement surface 76 of the placement wall 71 and the wire mounting section 81 formed on the tip of the projecting section 77 and having the plurality of voltage detection wires 23 mounted thereon via the flexible hinge section 80, a step of placing the plurality of voltage detection wires 23 on the placement wall 71 of the wire arrangement section 70, a step of mounting the plurality of voltage detection wires 23 on the wire mounting section 81 with the wire mounting section 81 oriented to extend in a direction along the placement surface 76, and a step of orienting the wire mounting section 81 to extend in a direction intersecting with the placement surface 76 by bending the hinge section 80 after the plurality of voltage detection wires 23 are mounted on the wire mounting section 81.

The present invention is not limited to the above described and illustrated embodiment. For example, the following embodiments are also included in the technical scope of the present invention.

Although one wire mounting section 81 is formed in one wiring module 10 in the above embodiment, there is no limitation to this and a plurality of wire mounting sections 81 may be formed in one wiring module 10.

Although the wire mounting section 81 is formed on the end part of the insulating protector 15 in the above embodiment, there is no limitation to this and the wire mounting section 81 may be formed, for example, near a lateral center of the insulating protector 15 and the wire mounting section 81 can be formed at an arbitrary position of the insulating protector 15 according to need.

Although the wire mounting section 81 is oriented to extend in the direction perpendicular to the placement surface 76 of the placement wall 71 by bending the hinge section 80 in the above embodiment, there is no limitation to this and the wire mounting section 81 may be oriented to extend in a direction intersecting at an arbitrary angle to the placement surface 76.

Although the plurality of wires detect the voltages of the power storage elements 11 in the above embodiment, there is no limitation to this and the plurality of wires may detect temperatures of the power storage elements 11. Further, the plurality of wires may not be connected to the power storage elements 11. For example, a plurality of wires connected to a device different from the power storage module 13 may be routed in the wiring module 10.

The stopper 83 can be omitted.

The auxiliary wall 82 can be omitted.

The power storage element 11 can be a capacitor or a condenser.

LIST OF REFERENCE SIGNS

10: wiring module
11: power storage element
12: power storage element group
15: insulating protector
23: voltage detection wire
70: wire routing section
71: placement wall
76: placement surface
77: projecting section
80: hinge section
81: wire mounting section
82: auxiliary wall
83: stopper
85: wiring-module intermediary body

The invention claimed is:

1. A wiring module to be mounted on a power storage element group with a plurality of power storage elements, comprising:
an insulating protector made of insulating synthetic resin; and
a plurality of wires routed in the insulating protector, wherein:
the insulating protector includes a wire routing section in which the plurality of wires are routed, the wire routing section includes a placement wall having a placement surface on which the plurality of wires are placed, the placement wall is formed with a projecting section projecting from the placement surface and a wire mounting section having the plurality of wires mounted thereon via a flexible hinge section is formed on a tip of the projecting section;
the plurality of wires are mounted on the wire mounting section with the wire mounting section oriented to extend in a direction along the placement surface; and
the wire mounting section is oriented to extend in a direction intersecting with the placement surface by bending the hinge section after the plurality of wires are mounted on the wire mounting section.

2. The wiring module of claim 1, wherein the wire mounting section is formed with a stopper formed on an end part opposite to the hinge section to project toward a side opposite to a side where the wires are to be mounted and is configured to retain a fastening member for mounting the wires on the wire mounting section.

3. The wiring module of claim 2, wherein the wire mounting section is formed with an auxiliary wall formed to stand up on a surface where the wires are to be mounted.

4. The wiring module of claim 3, wherein the wires are connected to the plurality of power storage elements and detect voltages of the plurality of power storage elements.

5. A wiring-module intermediary body, comprising:
an insulating protector made of insulating synthetic resin; and
a plurality of wires routed in the insulating protector, wherein:
the insulating protector includes a wire routing section in which the wires are routed, the wire routing section includes a placement wall having a placement surface on which the plurality of wires are placed, the placement wall is formed with a projecting section projecting from the placement surface and a wire mounting section having the plurality of wires mounted thereon via a flexible hinge section is formed on a tip of the projecting section;
the wires are mounted on the wire mounting section with the wire mounting section oriented to extend in a direction along the placement surface;
the wire mounting section is oriented to extend in a direction intersecting with the placement surface by bending the hinge section after the wires are mounted on the wire mounting section.

6. A method for manufacturing a wiring module to be mounted on a power storage element group with a plurality of power storage elements, comprising:
forming an insulating protector with a wire routing section including a placement wall having a placement surface on which a plurality of wires are to be placed, a projecting section projecting from the placement surface of the placement wall and a wire mounting section formed on a tip of the projecting section and having the plurality of wires mounted thereon via a flexible hinge section;
placing the plurality of wires on the placement wall of the wire routing section;

mounting the plurality of wires on the wire mounting section with the wire mounting section oriented to extend in a direction along the placement surface; and orienting the wire mounting section to extend in a direction intersecting with the placement surface by bending the hinge section after the plurality of wires are mounted on the wire mounting section.

\* \* \* \* \*